Sept. 15, 1970    R. B. HODGDON, JR., ET AL    3,528,858
SULFONATED ARYL-SUBSTITUTED POLYPHENYLENE
ETHER ION EXCHANGE MEMBRANES
Original Filed April 7, 1967
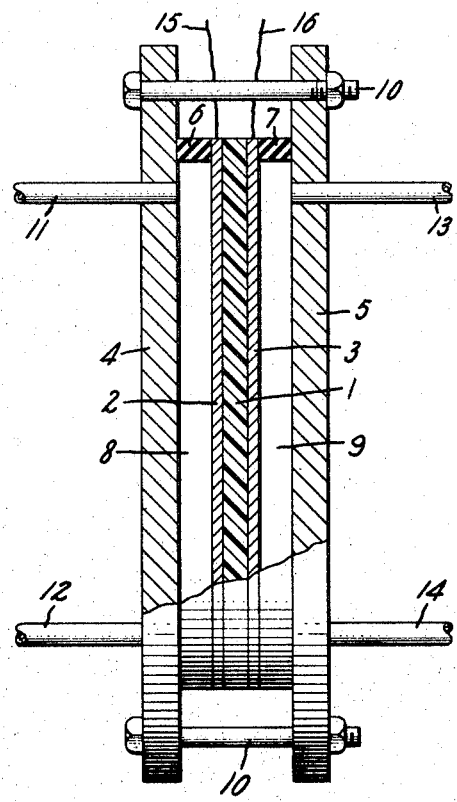
Inventors:
Russell B. Hodgdon, Jr.
Allan S. Hay,
by Carl O. Thomas
Their Attorney.

United States Patent Office 3,528,858
Patented Sept. 15, 1970

3,528,858
SULFONATED ARYL-SUBSTITUTED POLYPHEN-
YLENE ETHER ION EXCHANGE MEMBRANES
Russell B. Hodgdon, Jr., South Hamilton, Mass., and
Allan S. Hay, Schenectady, N.Y., assignors to General
Electric Company, a corporation of New York
Continuation of application Ser. No. 628,411, Apr. 7,
1967. This application Dec. 4, 1968, Ser. No. 785,010
Int. Cl. C08g 23/20
U.S. Cl. 136—86                          10 Claims

ABSTRACT OF THE DISCLOSURE

Our invention relates to a polyphenylene ether having sulfonated appending aryl groups directly attached to backbone phenyl groups. The sulfonated ether may be employed for purposes of ion exchange, and when the ether exhibits an intrinsic viscosity prior to sulfonation of at least 0.3 dl./g. it may be used in ion exchange structures, such as ion exchange membranes. Sulfonation of the appending aryl groups is achieved by blocking the backbone substitution positions with halogen or nitro groups. The resulting sulfonated polyphenylene ether differs from previously known sulfonated polyphenylene ethers in that it is resistant to desulfonation when utilized at higher than ambient temperatures. This renders the material ideally suited for use in fuel cells.

---

This application is a continuation of Ser. No. 628,411 filed Apr. 7, 1967, now abandoned.

Our invention is directed to fuel cells incorporating as electrolyte sulfonated polyphenylene ethers. Our invention is also directed to ion exchange structures and to novel compositions of matter comprised of sulfonated phenylene ethers as well as processes for their manufacture.

The use of continuous ion exchange structures, such as membranes, tubes, etc., in electrodialysis and fuel cells is by now well understood by those skilled in the art. The application of ion exchange structures to such cells, particularly fuel cells, has emphasized the desirability of obtaining ion exchange materials exhibiting high resistance to oxidative and hydrolytic breakdown as well as a high level of physical integrity and dimensional stability.

Newly developed polyphenylene ethers have recently attracted considerable attention for their chemical and physical stabilities at elevated temperatures. In two previously issued, commonly assigned patents, sulfonated polyphenylene ethers for use as ion exchange membranes in fuel cells have been disclosed. In the first of these, Pat. No. 3,259,592, Fox et al. discloses a cation exchange resin having a repeating structural unit of the formula:

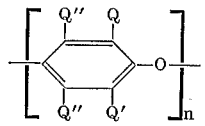

wherein the oxygen atom of one unit is connected to the benzene nucleus of the adjoining unit. The character $n$ stands for a positive integer and is at least 100. Q is a monovalent substitutent selected from the group consisting of hydrogen, aliphatic hydrocarbon radicals free of a tertiary alpha-carbon atom, and aliphatic halohydrocarbon radicals having at least two carbon atoms and being free of a tertiary alpha-carbon atom. Q' is a monovalent substituent which is the same as Q and in addition may be halogen, arylhydrocarbon radicals, haloarylhydrocarbon radicals, hydrocarbonoxy radicals having at least two carbon atoms and being free of an aliphatic tertiary alpha-carbon atom, and halohydrocarbonoxy radicals having at least two carbon atoms and being free of an aliphatic tertiary alpha-carbon atom. Q" may be the same as Q' and in addition —SO$_3$H. There is at least one sulfonate group in each repeating unit of the polymer. This patent is, by reference, made part of this disclosure.

In Pat. No. 3,262,892, Hay discloses a second cation exchange resin suitable for use in a fuel cell having the structural formula:

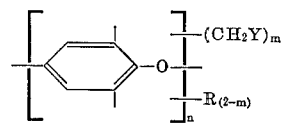

In this instance $n$ is a positive integer and is at least 10 while $m$ is a number from 0.01 to 2 inclusive, with the provisio that the produce obtained by multiplying $m$ by $n$ is at least 1. Y is an acidic substituent having an ionizable hydrogen having the formula

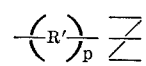

where $p$ is an integer from 0 to 1. R' is a divalent substituent selected from the group consisting of alkylene, haloalkylene, arylene, and haloarylene. Z is an acidic substituent selected from the group consisting of carboxy, sulfo and phosphono. R is a monovalent substituent selected from the group consisting of hydrogen, halogen, hydrocarbon free of an aliphatic tertiary alpha - carbon atom, halohydrocarbon free of analiphatic tertiary alpha-carbon atom and OR' were R' is a monovalent substituent selected from the group consisting of hydrocarbon free of an aliphatic, tertiary alpha-carbon atom and halohydrocarbon free of an aliphatic, tertiary alpha-carbon atom. This patent is, by reference, made part of this disclosure.

In each of the above patents the polyphenylene ethers are sulfonated directly on the backbone phenyl groups or on an alkyl or aralkyl substituent. While these ethers have been found useful for various ion exchange applications, some tendency toward splitting off sulfonic acid substituents has been noted in certain types of applications. For example, fuel cells frequently operate at temperatures well above normal ambient conditions. Depending upon the current levels drawn from a fuel cell, its operating temperature may, in the absence of external cooling, range from ambient temperature to temperatures near, at, or even above the boiling point of water. The elevated temperatures tend to produce cleavage of the sulfonic acid groups from the polyphenylene ethers. At the same time water is being produced in the fuel cells as a reaction product. This water is continuously removed from the fuel cells to prevent drowning of the electrodes. Accordingly, after a period of operation in a fuel cell an ion exchange membrane formed of a conventional sulfonated polyphenylene ether may exhibit a substantially reduced ability to act as anionic conductor. This is a direct result of the loss of ion exchange groups from the ion exchange polymer.

We have discovered quite unexpectedly that when a polyphenylene ether is sulfonated selectively on appending aryl groups attached directly to backbone phenylene groups, an ion exchange polymer results of improved stability. The polymer so formed is substantially immune to the splitting of sulfonic acid groups at temperature levels at or near the boiling point of water as are encountered in fuel cells.

Our invention is also directed to an ion exchange structure comprised of an ion exchange polymer as defined above having an intrinsic viscosity prior to sulfonation of at least 0.3 dl./g. (measured in chloroform at 25° C.). Water is present in an amount ranging from 15 to 80 percent by weight based on the combined weights of the water and the ion exchange polymer. The ion exchange structure exhibits an ion exchange capacity in the range of from 1.00 to 2.50 meq. $H^+$ per gram of polyphenylene ether.

As a preferred application, our invention is directed to a fuel cell incorporating an ion exchange structure as defined above as well as first and second opposed electrodes in contact with the ion exchange structure. Means are provided for supplying a fuel to the first electrode and an oxidant to the second electrode.

Our invention is additionally directed to a novel process of forming the ion exchange polymers, which is comprised of displacing the backbone phenyl hydrogen of a polyphenylene ether with a monovalent substituent chosen from the group consisting of halogen and nitro in an amount sufficient to increase the relative lability of the appending aryl hydrogen. A sulfonic acid group is then introduced by displacement of at least a portion of the relatively labile appending aryl hydrogen.

Our invention may be better understood by reference to the following detailed description considered in conjunction with the drawing, which is an elevation, partly in section, of a fuel cell.

As a starting material for the practice of our invention we employ any polyphenylene ether having appending aryl groups directly attached to backbone phenyl groups. Such polyphenyl ethers are by now well understood in the art. For example, Allan S. Hay in commonly assigned Patent No. 3,306,875 issued Feb. 28, 1967, incorporated by reference as part of this disclosure, discloses a process of forming novel polyphenyl ethers through the polymerization of 2,6-disubstituted phenols. We prefer to employ poly-(2,6-diaryl-1,4-phenylene ethers) in which one of the appending aryl groups is phenyl and the other appending aryl is selected from the group consisting of phenyl, phenyl having 1 to 5 $C_{1-8}$ alkyl substituents, biphenylyl, terphenylyl and naphthyl. Such polyphenylene ethers as well as an improved process for their manufacture is disclosed by Hay in commonly assigned patent application Ser. No. 593,733, filed Nov. 14, 1966 now U.S. Pat. 3,432,466, the disclosure of which is also incorporated by reference.

It is appreciated that ion exchange polymers have many applications which do not require any appreciable structural integrity. For example, ion exchange polymers have been used widely both in dissolved form and as friable powders. For other applications where structural integrity is desired, as in the fabrication of membranes, tubes, rods, etc., it is preferred to employ polyphenylene ethers having an intrinsic viscosity of at least 0.3 deciliters per gram when measured in chloroform at 25° C. Intrinsic viscosity is, of course, measured prior to sulfonation, since the polymers in their sulfonated form are not soluble in chloroform. All subsequent references to intrinsic viscosity assume for the sake of brevity such measurement conditions. The maximum intrinsic viscosity is not critical. Polymers exhibiting intrinsic viscosites as high as 1.2 dl./g., for example, differ only slightly in physical properties from polymers exhibiting intrinsic viscosities of 0.7 dl./g. Intrinsic viscosity is commonly relied upon as an indirect measure of molecular weight, since it is recognized that a direct relationship exists between intrinsic viscosity and molecular weight for polymers of comparable linearity. Polyphenylene ethers having intrinsic viscosities above 0.3 dl./g. are in all instances, even when subsequently sulfonated to the maximum degree contemplated, sufficiently structurally stable and water insoluble to have utility in fabricating ion exchange structures.

The polyphenylene ether having appending aryl directly attached to backbone phenyl groups is converted to an ion exchange polymer by selectively sulfonating the appending aryl groups. As a first step toward accomplishing this, the polyphenylene ether is dissolved in a liquid halogenated hydrocarbon. The chlorinated lower alkyl hydrocarbons are generally preferred. Analogs thereof incorporating the other halogens may be used but are somewhat more expensive. The proportion of polymer to solvent is not critical. On a weight basis it is generally preferred to employ from 20 to 100 parts solvent per part polymer. Chloroform, ethylene dichloride, tetrachlorethane, and carbon tetrachloride are exemplary of preferred, low cost, readily available solvents.

The next step of the process is undertaken to increase the relative lability of hydrogen attached to the appending aryl groups. In its initial form the hydrogens attached to the backbone phenyl groups of the polyphenylene ether are relatively more labile than the hydrogens attached to the appending aryl. It is a feature of our invention that this relationship is reversed so that appending aryl hydrogens become the most easily displaced components of the polyphenylene ether. To accomplish this, the backbone phenyl hydrogens are displaced with a substituent such as a halogen or nitro group.

Halogenation is accomplished, for example, merely by intimately contacting the halogen with the dissolved polymer. Bromination is preferably accomplished by refluxing bromine and the dissolved polymer at a temperature in the range of from 25° to 60° C. Because of its higher chemical reactivity, it is preferred to chlorinate using chlorine gas at temperatures from 0° to 25° C. Iodine substitution is best accomplished by mixing chloroiodide with the dissolved polymer at temperatures in the range of from 28° to 90° C. Fluorination may be accomplished by first brominating and then displacing the bromine with fluorine through reaction of the brominated polymer with potassium fluoride at 100° C. Nitration is readily accomplished by the dropwise addition of fuming nitric acid to the halocarbon dissolved polymer. Other conventional techniques for substitution may be employed, if desired.

When the backbone phenyl hydrogen are displaced with halogen, it is desirable to employ an excess of halogen to obtain the maximum backbone hydrogen displacement. Incorporation of at least 1.5 halogen per polymer repeating unit as an average value has been found sufficient to increase the lability of hydrogen associated with appending aryl groups. When, however, the backbone hydrogen are displaced with a nitro group, which is a meta directing substituent, it is unnecessary to displace more than one hydrogen per backbone phenyl group, since the deactivation produced by the presence of a nitro group will render any remaining backbone hydrogen less labile than the appending aryl hydrogen. While the above backbone phenyl substituents are preferably incorporated in the final ion exchange polymer simply as a matter of convenience, it is appreciated that these substituents may be removed from the polymer by any desired conventional technique once sulfonation has been accomplished.

Forming of our novel ion exchange polymer is completed by sulfonation. This is preferably accomplished by introducing a conventional sulfonating agent, such as sulfur trioxide, chlorosulfonic acid, oleum, concentrated sulfuric acid, etc., into a solvent in which the polymer is dissolved. This may be any solvent which is not attacked by the sulfonating agent. Preferably, the solvent used in substituting backbone phenyl groups is employed, the polymer simply remaining in the same solvent for the performance of both steps. The proportion of sulfonating agent is not critical and may be varied widely, depending on the ion exchange capacity desired. The term "ion exchange capacity" is quantitatively defined by the formula:

$$IEC_A = \frac{H^+}{A}$$

$IEC_A$=The ion exchange capacity
$H^+$=The milliequivalents of hydrogen ions present, and
$A$=The weight of polyphenylene ether (no water included) in grams Where it is desired to fabricate the ion exchange polymer into an ion exchange structure, the polymer formed should preferably exhibit an ion exchange capacity in the range of from 1.00 to 2.50. It is recognized, of course, that ion exchange structures of lower ion exchange capacity could be employed, if desired, although at the price of a proportionate loss in effectiveness. Also, in applications where dimensional stability is not a criteria for satisfactory performance—e.g. ion exchange beads, water suspended ion exchangers, etc.—ion exchange polymers having an ion exchange capacity above 2.50 may be usefully employed. We have found that useful ion exchange polymers may be obtained where the sulfonating agent is added to the dissolved polymer in a proportion to provide from about 0.1 to 1.0 sulfonic acid group per repeating phenyl ether polymeric unit.

Upon sulfonation the ion exchange polymer will precipitate from the liquid halogenated hydrocarbon previously used as a solvent. Recovery of the ion exchange polymer formed and its fabrication into an ion exchange structure can then be accomplished according to techniques well known to the art. We prefer to form ion exchange structures by the solvent casting technique. This consists of separating the ion exchange polymer precipitate from the liquid halogenated hydrocarbon and redissolving the polymer in a new solvent, such as alcohol, ketone, etc. The solvent may be used in any desired proportion. A plasticizer may be optionally blended with the solvent at this point. Although plasticiers are not required in ion exchange structures formed according to our invention, a suitable plasticier which may be incorporated is disclosed by Hodgdon in commonly assigned application Ser. No. 628,409, filed on even date herewith, titled Improvements Relating to Cation Exchange Fuel Cells. Ion exchange membranes may be formed merely by casting the dissolved ion exchange polymer onto a flat surface and allowing the solvent to evaporate. The solvent casting technique of forming ion exchange structures is generally well known in the art as evidenced by Clarke Pat. No. 2,730,768, issued Jan. 17, 1956.

The sulfonated polyphenylene ethers formed according to our invention possess sufficient structural integrity and low cost to be suitable for forming ion exchange structures including no other solid component. It is recognized nevertheless that techniques have been previously developed in the art for improving the strength of ion exchange structures formed of lower strength and less dimensionally stable ion exchange polymers, which are fully applicable to use with our material. For example, screens, cloth, fibers, and other conventional reinforcing materials may be optionally embedded in ion exchange structures formed of our sulfonated polyphenylene ethers. It is also recognized as a conventional alternative to stretch more expensive ion exchange polymers by blending with less costly non-ion exchange polymers or inorganic fillers.

It is noted that the incorporation of structural reinforcing materials and/or extenders will function to dilute the ion exchange polymer and reduce the equivalent ion exchange capacity of the resulting ion exchange structure. The term "equivalent ion exchange capacity" is defined quantitatively by the formula:

$$IEC_{AB} = IEC_A + \frac{A}{A+B}$$

where:

$IEC_{AB}$=The equivalent ion exchange capacity
$IEC_A$=The ion exchange capacity of the ion exchange polymer
$A$=The weight in grams of dry ion exchange polymer (no water included)
$B$=The weight in grams of the solid inert ingredient (no water included)

When the ion exchange polymer accounts for the entire weight of the dry structure, the equivalent ion exchange capacity corresponds to the ion exchange capacity of the ion exchange polymer. It is preferred that ion exchange structures formed according to our invention exhibit an equivalent ion exchange capacity in the range of from 1.00 to 2.50. As indicated quantitatively above, the ion exchange capacity of the sulfonated polymer and proportion of added materials may be readily adjusted to maintain the desired equivalent ion exchange capacity. The incorporation of structural reinforcing materials may, of course, permit the use of somewhat more highly sulfonated ion exchange polymers than could be otherwise employed.

In order to impart mobility to the hydrogen ions and, hence, ionic conductivity to the ion exchange structure, it is necessary that the structure include not only ion exchange polymer but also water. The water content is expressed in weight percent according to the following formula $$HOH = \frac{W}{W+A+B} \times 100$$

where:

$HOH$=Water content in percent, by weight
$W$=Weight of water present in grams
$A$=Weight in grams of dry ion exchange polymer
$B$=Weight in grams of solid inert ingredient The water content may range from as low as 15 percent up to 80 percent, by weight. The water content does not include supernatant water but only the water remaining after the ion exchange structure appears dry and feels dry to the touch—i.e., the sorbed water, also referred to as water held by secondary van der Waals forces. The water may be incorporated in the ion exchange structure at any time prior to use. When the solvent casting technique for forming the ion exchange structures is employed, generally the ion exchange structures are brought into contact with water immediately after formation.

The ion exchange structures formed according to our invention are, in their preferred form, particularly advantageous in fuel cell applications, since they exhibit a higher resistance to oxidative and hydrolytic breakdown under the rigorous operating conditions encountered in fuel cells than ion exchange structures formed of materials heretofore employed. While particular emphasis is given to fuel cell use, it is recognized that our ion exchange structures may be put to a variety of alternative and less stringent applications. For example, ion exchange structures formed according to our invention may be employed in electrodialysis cells (note Juda et al. Re. Pat. 24,865), oxidizable or reducible gas concentration cells (note Maget commonly assigned application Ser. No. 385,925, filed July 29, 1964), regenerative fuel cells (note White et al. commonly assigned application Ser. No. 509,-823, filed Nov. 26, 1965), oxidizable or reducible gas sensor cells (note Warner commonly assigned Pat. No. 3,149,921), etc. It is appreciated that such cells, although applied to dissimilar functions, may bear structural identity with fuel cells. Accordingly, the term "fuel cell" is merely intended to designate the preferred application of a cell structure.

When the membranes formed according to our invention are mounted in a fuel cell, they are used in combination with an anode and a cathode, as is well understood in the art. Grubb Pat. No. 2,913,511, Niedrach Pat. No. 3,134,697, and Maget Pat. No. 3,274,031, each of which are commonly assigned, are illustrative of conventional fuel cell electrodes which may be conveniently employed. We prefer to use electrodes of the type disclosed by Niedrach in Pat. No. 3,297,484 and Niedrach et al. in commonly assigned patent application, Ser. No. 232,689, filed Oct. 24, 1962, now U.S. Pat. 3,432,355 which is incorporated by reference into this disclosure.

A specific fuel cell configuration is shown in the drawing. An ion exchange membrane 1 formed according to our invention is mounted between electrodes 2 and 3. The membrane and electrodes together form a membrane-electrode assembly. Fixtures 4 and 5, separated from electrodes 2 and 3, respectively by insulating shims 6 and 7 form reactant chambers 8 and 9 adjacent the electrodes. The fixtures, shims, and membrane-electrode assembly are held together by tie bolt assemblies 10. Conduits 11 and 12 in fixtures 4 and conduits 13 and 14 in fixture 5 allow ingress and egress of fluent reactants and products to and from the fuel cell. Electrical energy may be removed from the fuel cell through electrical leads 15 and 16 attached to electrodes 2 and 3, respectively.

The following examples are for purposes of illustration and are not intended to limit the invention.

EXAMPLE 1

A sample of 12.2 grams of poly-(2,6 diphenyl-1,4 phenylene ether) having an intrinsic viscosity of 0.71 deciliters per gram, as measured in chloroform at 25° C., was dissolved by stirring in 400 ml. of chloroform in a one liter resin kettle equipped with a heating mantle, stirrer, addition funnel, and thermometer. Through the addition funnel 17.7 grams of bromine dissolved in 50 ml. of chloroform was added dropwise with stirring over a one hour period at room temperature. After replacing the addition funnel with a reflux condenser, the kettle was heated to 50° C. and stirred for a period of six hours, then cooled to room temperature. The addition funnel was replaced and a 10 percent by weight aqueous solution of sodium bisulfite was added to the kettle in the amountt of 100 ml. This produced a change in color from red to colorless. The heterogeneous kettle contents were then transferred to a two liter separatory funnel. The chloroform (bottom) layer was removed from the kettle, extracted three times with 50 ml. of distilled water, then transferred to an open glass tray. The chloroform was then evaporated by placing the tray over a steam bath. This left a tan residue which showed an analysis to contain 1.8 bromine atoms per backbone aryl ring of the polymer.

EXAMPLE 2

A 20.2 gram sample of brominated poly-(2,6 diphenyl-1,4 phenylene ether) prepared by the procedure of Example 1 was redissolved in 400 ml. of chloroform in a one liter resin kettle equipped with a stirrer, thermometer, and addition funnel. Thirty grams of chlorosulfonic acid in 34 ml. of chloroform were charged to the addition funnel and this sulfonating reagent added to the stirred solution dropwise at a rate of 2 drops per second and at room temperature (25° C.). When 22 grams of chlorosulfonic acid had been added, a grey precipitate separated from the chloroform solvent. Sulfonation was then stopped, and the liquid immediately decanted from the precipitate. The precipitate was then dissolved in 200 ml. of methyl alcohol and cast into plastic trays. Ventilation adequate to permit the evaporation of methyl alcohol was permitted so that the dried sulfonated and brominated polyether polymer was left in the trays. The polymer was washed three times with de-ionized water, dried, and then dissolved in methyl alcohol so as to give a twenty percent by weight solution. A total weight of 25.2 grams of sulfonated poly-(2,6 diphenyl-3,5 partially brominated phenylene ether) was obtained. The ion exchange capacity was found to be 1.71 meq. hydrogen ion per gram of dry polyphenylene ether.

EXAMPLE 3

The sulfonated and brominated polyphenylene ether prepared by Example 2 was dissolved in methanol so as to make a casting solution containing 20 percent by weight polymer. The solution was spread out on a level casting table and covered with a perforated tray to slow evaporation of the solvent. On standing overnight, a smooth and dry clear film was lifted from the casting table and placed in distilled water. The wet film was observed to be quite flexible, strong, and optically transparent. The transverse resistivity of a portion of the film when exchanged with potassium ions and tested in a General Radio resistance bridge at 1 kc. was found to be 2.4 ohm-cm.$^2$. The thickness of the wet film was 9.2 mils. The water content of the film (measured after the membrane was relieved of supernatant water so as to feel dry to the touch) was 36.5 percent by weight based upon the combined weights of the water and polymer.

EXAMPLE 4

A 3.5" by 7.5" rectangular section of the film formed in Example 3 was cut for mounting in a fuel cell similar to that shown in the drawing. Two electrodes formed according to the teaching of copending, commonly assigned patent application Ser. No. 232,689, filed Oct. 24, 1962, which is incorporated into this specification by reference, were united to the membrane section by pressing at 12,000 p.s.i. at 225° F. in a flat bed press. The electrodes each contained a platinum loading of 35 mg./cm.$^2$. The electrodes were formed of a paste of 85 weight percent platinum and 15 weight percent polytetrafluoroethylene binder. The platinum used exhibited a surface area of approximately 30 square meters per gram. The polytetrafluoroethylene wet-proofing coating employed on the gas side of each electrode was present in the amount of 1.6 mg./cm.$^2$. Woven 45 mesh platinum screens were incorporated in the electrodes as current collectors. The active area of the electrodes was 2" by 6".

Using hydrogen as a fuel and oxygen as an oxidant, the following cell performance was obtained

| Current density amperes/sq. ft.: | Potential (IR losses incl.) volts |
|---|---|
| 11.1 | 0.944 |
| 22.2 | 0.900 |
| 33.3 | 0.866 |
| 44.4 | 0.837 |
| 50.0 | 0.809 |
| 100.0 | 0.710 |

The polarization data was obtained employing an ammeter, a voltmeter, and a variable electrical resistance. While Examples 1–4 inclusive utilize poly-(2,6 diphenyl-1,4 phenylene ether), other species of poly-(2,6 diaryl-1,4 phenylene ether) may be used without material variations in procedure or result.

EXAMPLE 5

The procedure of Examples 1 through 3 inclusive were replicated, except that a polymer differing only by an intrinsic viscosity of 0.55 deciliters per gram was used as a starting material. The ion exchange capacity of the sulfonated and brominated polymer formed was found to be 1.36 meq. hydrogen ion per gram dry resin. The transverse resistivity of a portion of the film in the potassium ion form was measured using a General Radio resistance bridge at 1 kc. and found to be 3.4 ohm-cm.² The film thickness was 5.5 mils. The water content was found to be 21.3 weight percent. Like the film obtained in Example 3, the film was flexible when wet, strong, and was transparent and optically clear. These tests showed the film to be suitable for use in a fuel cell similarly as the film prepared in Example 3.

EXAMPLE 6

A similar procedure as described in Examples 1 through 3 inclusive was followed, except that the film was first chlorinated rather than brominated. A film having a thickness of 7.2 mils was formed which when tested in a General Radio resistance bridge at 1 kc. in the potassium ion exchanged form yielded a transverse resistivity of 2.15 ohm-cm.² The water content when the film felt dry to the touch was noted to be 32.6 weight percent based upon the combined weights of the water and polymer.

EXAMPLE 7

A sample of 2.5 grams of poly-(2,6 diphenyl-1,4 phenylene ether) having an intrinsic viscosity of 0.55 deciliters per gram (in chloroform at 25° C.) was dissolved in 30 ml. of chloroform and 5 ml. of acetic anhydride in a 125 ml. 3 neck flask equipped with a magnetic stirrer having a polytetrafluoroethylene stirrer bar, a thermometer, an addition funnel, and a reflux condenser. The base of the flask was immersed in an ice bath. Exactly 1.00 ml. of fuming nitric acid was added to 2 ml. of chloroform, 2 ml. of glacial acetic acid and 2 ml. of acetic anhydride held in the addition funnel. After cooling the reaction flask and dissolved polymer to 15° C., the nitrating mixture in the funnel was introduced into the flask dropwise until a temperature of 20° C. was reached. The flask was then allowed to recool to 15° C., and the balance of the nitrating mixture was added. The temperature rose to 22° C. before again receding. The flask was removed from the ice bath and stirred overnight. Water in the amount of 100 ml. was added to the flask while stirring. The chloroform containing layer which separated was withdrawn and the chloroform evaporated to yield a yellow polymer deposit weight 2.6 grams. Infra-red absorption tests showed nitro groups to be present in the polymer, and subsequent analysis showed 0.70 weight percent nitrogen.

The nitrated polymer was sulfonated according to the procedure of Example 2 and formed into a film as described in Example 3. The thickness of the film formed was 7 mils. The film was observed to be strong and flexible when wet. The transverse resistivity of the film when measured in the potassium exchanged form was found to be 1.59 ohm-cm.² when measured in a General Radio resistance bridge at 1 kc. The water content of the membrane when dry to the touch was 36.4 weight percent based upon the combined weights of the water and polymer.

EXAMPLE 8

The procedure of Example 7 was repeated, except that a polyphenylene ether differing only by an intrinsic viscosity of 0.81 deciliters per gram was substituted as the starting material. The amount of fuming nitric acid was increased from 1 to 3 ml. The film exhibited a thickness of 8.5 mils and a water content when dry to the touch of 44.7 weight percent. The transverse resistivity of the material when exchanged in its potassium ion form was found to be 1.6 ohm-cm.² as measured in a General Radio resistance bridge at 1 kc. The film was observed to be strong and flexible when wet.

EXAMPLE 9

In a 250 ml. Erlenmeyer flask 3 grams of sulfonated poly-(2,6 dimethyl-1,4 phenylene ether) having an ion exchange capacity of 2.04 meq. hydrogen ion per gram of dry resin was suspended in 25 ml. of distilled water. The flask was maintained at 90° C. by thermostatic control for 36 hours. At the end of the test period a 5 ml. sample was removed from the flask, and the sulfonated polyphenylene ether was found to have an ion exchange capacity of 1.42 meq. hydrogen ion per gram of dry resin. This represented a degradation of 34.7 percent in ion exchange capacity. The cleavage of sulfonic acid groups to form free sulfuric acid was confirmed by the precipitation of barium sulfate upon addition of barium nitrate to the flask. Similar cleavage is evidenced with other sulfonated polyphenylene ethers lacking blocking groups attached to the backbone aryl groups, including sulfonated poly-(2,6 diaryl-1,4 phenylene ether).

By contrast, polymers formed according to preceding examples when similarly tested at elevated temperatures for prolonged periods exhibit ion exchange capacity losses only in the order of 0.05 to 0.01 meq. hydrogen ions per gram of dry resin. Upon the addition of barium nitrate to these solutions no visually discernible precipitate is formed. This indicates that loss of ion exchange capacity if it occurs at all is too slight to be of significance so far as fuel cell applications are concerned.

While we have described and exemplified our invention with reference to certain preferred embodiments, it is appreciated that numerous variations will readily occur to those skilled in the art. It is accordingly intended that the scope of our invention be determined with reference to the following claims.

What is claimed as new and desired to be secured by Letters Patent of the United States is:

1. An ion exchange polymer consisting essentially of poly (2,6-diaryl-1,4-phenylene ether) selectively sulfonated on the appending aryl groups, one appending aryl of said polyphenylene ether being phenyl and the remaining appending aryl being chosen from the group consisting of phenyl, phenyl having 1–5 $C_{1-8}$ alkyl substituents, biphenylyl, terphenylyl and naphthyl, said polyphenylene ether having monovalent substitutents on the backbone phenylene groups chosen from the group consisting of halogen and nitro in an amount sufficient to decrease the hydrogen lability of said backbone phenylene group (so that said polyphenylene ether is selectively sulfonatable in the appended aryl groups).

2. An ion exchange polymer according to claim 1 in which said polyphenylene ether prior to sulfonation exhibits an intrinsic viscosity in excess of 0.3 dl./g.

3. An ion exchange polymer according to claim 1 in which said polyphenylene ether has bromine substituents on the backbone phenylene groups.

4. An ion exchange polymer according to claim 1 in which said polyphenylene ether has chlorine substituents on the backbone phenylene groups.

5. An ion exchange structure comprised of an ion exchange polymer as defined by claim 1 having prior to sulfonation an intrinsic viscosity of at least 0.3 dl./g. and water in an amount ranging from 15 to 80 percent by weight based on the combined weight of said water and said polymer, and said ion exchange structure exhibiting an ion exchange capacity in the range of from 1.00 to 2.50 meq. H⁺ per gram of dry polyphenylene ether.

6. A fuel cell comprised of an ion exchange structure as defined by claim 5, first and second opposed electrodes in contact with said ion exchange structure, and means for supplying a fuel to said first electrode and for permitting an oxidant to contact said second electrode.

7. A process of forming an ion exchange polymer comprising displacing backbone hydrogen from a polyphenylene ether having appending aryl directly attached to the backbone phenyl groups with a monovalent substituent chosen from the group consisting of halogen and nitro groups in an amount sufficient to increase the relative lability of the appending aryl hydrogen, and introducing a sulfonic acid substituent by displacement of at least a portion of said relatively labile appending aryl hydrogen.

8. A process of forming an ion exchange polymer according to claim 7 in which said polyphenylene ether is poly (2,6-diaryl-1,4-phenylene ether), one appending aryl of said ether being phenyl and the remaining appending aryl being chosen from the group consisting of phenyl, phenyl having 1 to 5 $C_{1-8}$ alkyl substituents.

9. The process of claim 7 wherein the monovalent substituent is halogen.

10. The process of claim 7 wherein the monovalent substituent is nitro.

References Cited

UNITED STATES PATENTS

| 3,226,361 | 12/1965 | Borman | 260—47 |
| 3,259,592 | 7/1966 | Fox et al. | 260—47 |

WILLIAM SHORT, Primary Examiner

M. GOLDSTEIN, Assistant Examiner

U.S. Cl. X.R.

136—153; 204—296; 260—2.2, 47